July 1, 1930. E. F. MAAS 1,769,703
DRIVING MECHANISM FOR CONVEYER BELTS
Filed Oct. 19, 1925
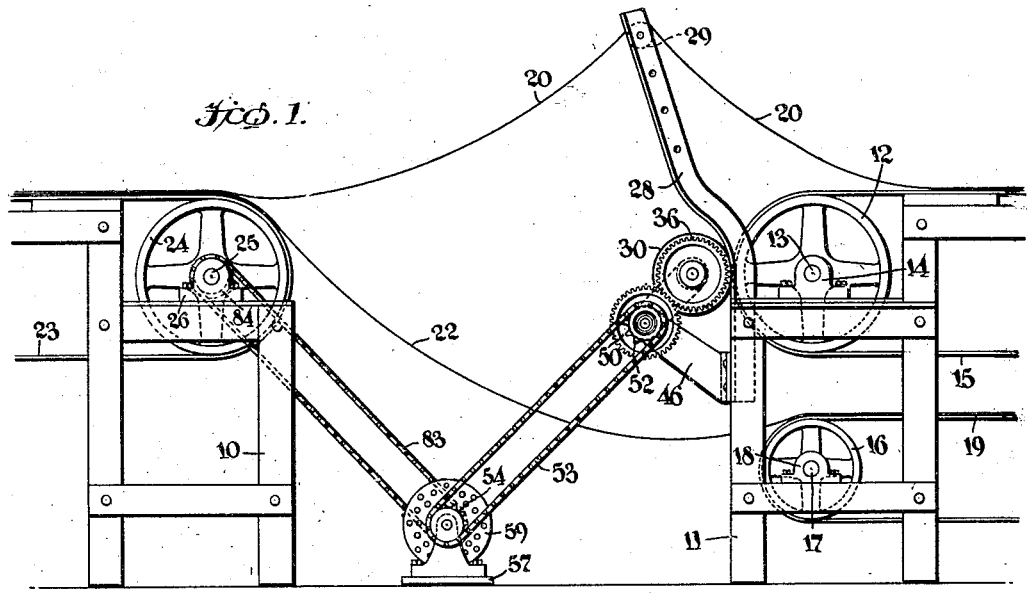
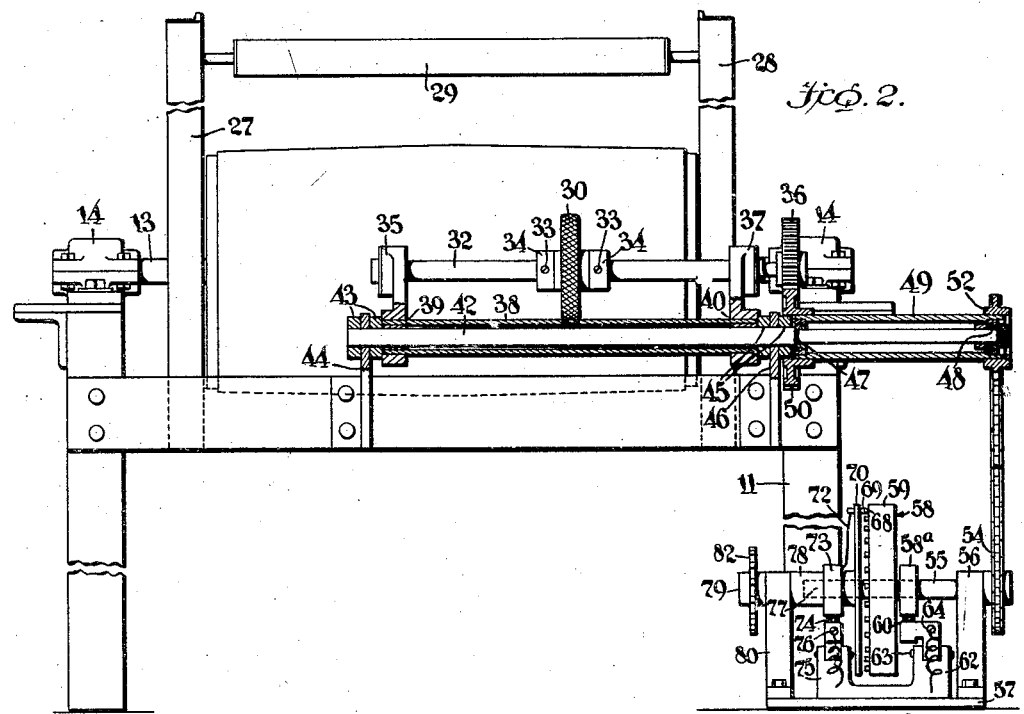
Inventor
Elov F. Maas, Patented July 1, 1930

1,769,703

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

DRIVING MECHANISM FOR CONVEYER BELTS

Application filed October 19, 1925. Serial No. 63,389.

My invention relates to apparatus for operating conveyer belts and it has particular relation to an apparatus adapted to control and synchronize the speed of conveyer belts constituting a portion of a conveyer system employed in manufacturing pneumatic tires.

The object of my invention is to provide an apparatus for controlling the linear speed of several associated conveyer belts in order to insure uniform feeding of strip material from one conveyer belt or set of conveyer belts, to another.

In the installation of gearing including an electrically driven mechanism constituting two or more units of machinery, having several elements which must be operated in synchronism, it has been customary to employ electrical rheostats to maintain the required regulation of the speed of the power supplying motors. Various arrangements of gearing have been employed with a view to maintaining several units in synchronism with the aid of such rheostats, but in designing belt drives for operating two or more units, it has been found that certain small variations in belt surface speed will occur, which cannot be corrected, for example by changing one tooth in a train of gearing.

My invention is directed primarily to the provision of apparatus which will compensate for such variations and to obtain speed regulation and adjustment to a minute degree, not possible when sprocket or toothed gearing is employed to make such adjustments. With this end in view, I have provided a special arrangement of regulating mechanism in connection with a rotating automatic rheostat, which includes a friction disc adapted to operatively engage a crowned pulley or roller. The friction disc is driven by the crowned portion of the pulley and it is adjustable along the slope thereof. Suitable mechanism operatively connects the disc to one element of the rotating rheostat and drives the latter. Another element of the rheostat is connected to a second pulley or roller which is to be synchronized with the first named pulley. By this arrangement, the disc may be moved toward the center of the face of the crowned pulley and the speed of travel is increased by a small amount. As an example, in employing a crowned pulley ten inches in diameter provided with a crowned portion having 1/8 inch variation in diameter for every 10 inches, the peripheral variation for 1 inch axial adjustment of the friction disc amounts to 0.125%. Thus it will be apparent that adjustment may be obtained to such degree that the variation is imperceptible.

For a better understanding of my invention, reference may now be had to the accompanying drawings forming a part of this specification, of which:

Fig. 1 is a fragmentary side elevational view of an apparatus embodying my invention;

Fig. 2 is an end elevational view partly in cross section of a portion of the apparatus illustrated by Fig. 1; and Fig. 3 is a diagrammatic plan view showing electrical connections employed in conjunction with my invention.

In practising my invention, I have incorporated one embodiment thereof in a tire building machine, which is specifically described in my copending application, Serial No. 25,554, filed April 24, 1925, and which includes two adjacently disposed supporting frame structures 10 and 11, arranged in alignment with each other. The frame structure 11 is adapted to support a crowned pulley or roller 12 mounted upon a shaft 13, journalled in suitable bearings 14 at opposite sides of the frame. An endless driven conveyer belt 15 is disposed about the roller 12. A second roller or pulley 16 is mounted below the roller 12 upon a shaft 17 which is journalled in bearings 18 secured to the frame structure 11. This roller is also provided with a conveyer belt 19 and is adapted to be driven at a predetermined rate of speed such that the surface speed thereof is the same as that of the pulley 12.

The conveyer belts 15 and 19 are adapted to carry plies of rubberized tire building fabric 20 and 22, respectively, which are fed concurrently upon a driven conveyer belt 23 trained about a roller 24 provided with an axial shaft 25 which is journalled in bearings 26 mounted on opposite sides of the frame 10. In order to maintain the plies 20 and 22 sufficiently separated until they reach the conveyer belt 23, two stanchions 27 and 28 are secured to the end of the frame 11 and support a roller 29 over which the ply 20 extends at considerable distance above the frame 11.

Since the conveyer belts 15 and 19 feed the plies 20 and 22 therefrom, at a pre-determined speed, it is necessary that the conveyer belt 23 be driven at the same pre-determined rate of speed. The rate of travel of these conveyor belts can be calculated relatively closely, but it has been found that conveyer or drive belts employed in driving two units of machinery will not always maintain the same rate of speed, and, accordingly, even a slight discrepancy will eventually result in the difficulty of having one or more of the plies sagging to the floor or becoming taut or stretched. This is caused by the distortion of the belt as it engages the pulleys, wherein the outer surface of the belt is tensioned or stretched and the inner surface engaging the pulleys is compressed or contracted. In the body of the belt between the outer and inner surfaces thereof, the points which travel at the same rate of speed as the straightened portions of the belt cannot accurately be determined.

In order to adjust the speed ratio between the two belts to the minutest degree, compensating for the changes which occur at the pulleys, I provide an apparaus including a friction disc wheel 30 adapted to operatively engage the crowned pulley 12 through the conveyer belt 15. The disc is mounted upon a shaft 32 and is axially adjustable thereon by means of set screws 33 extending through collars 34 secured to the disc. One end of the shaft 32 is journalled in the upper end of a bearing support 35 and the other end thereof is provided with a gear wheel 36 rigidly secured thereto. Adjacent the gear wheel 36 the upper end of a second bearing support 37 similar to the bearing support 35, cooperates with the latter in rotatably supporting the shaft 32.

The lower ends of the bearing supports 35 and 37 are rigidly connected by a tubular member 38. These three elements constitute a hinged member journalled at each end of the tubular member, as indicated at 39 and 40, upon a shaft 42, which extends through the tubular member 38. The hinged member is inclined towards the pulley 12 and consequently the friction disc 30 engages the roller by force of gravity. One end of the shaft 42 is secured by means of collars 43 upon a bracket 44 carried by the frame 11. An intermediate portion of the shaft 42 adjacent the bearing 40 is likewise secured by means of collars 45, upon a bracket 46 mounted upon the frame 11.

The portion of the shaft 42 extending beyond the bracket 46 is provided with journal bearings 47 and 48, for rotatably supporting a hollow shaft 49. At one end of the hollow shaft 49, a gear wheel 50, rigidly secured thereto, is adapted to operatively engage the gear wheel 36, and to be rotated thereby. The other end of the shaft 49 rigidly supports a sprocket wheel 52 which is provided with a sprocket chain 53. From this description it will be apparent that the disc 30 rotatably engaging the roller 12 will cause the gear wheel 36 to drive the gear 50 and the sprocket 52, through the hollow power shaft 49. The speed of the disc 30 may be regulated by axial adjustment thereof along the shaft 32 by moving the former toward and away from the center of the crowned pulley 12.

As best shown in Fig. 2, the chain 53 is connected to a sprocket 54, which is keyed to the outer end of a shaft 55 journalled in a bearing bracket 56 formed on a support 57 and which operates a circular electrical resistance unit 58 of an automatic rotatable rheostat 59. Adjacent the resistance unit 58 and electrically connected thereto is a collector ring 58ª, which is engaged by a brush 60 mounted upon a lug 62 provided on the support 57 and secured thereto by means of a pin or bolt 63. A wire connection 64 communicating with an electric motor 65 (Fig. 3) is connected to main power lines 66. The motor is provided with reducing gearing, generally indicated by the numeral 67, for driving the rollers 12 and 16.

One side of the resistance unit 58 is provided with rheostat contacts connected to a resistance element contained within the unit 58 and adapted to be engaged by a brush 69 mounted upon a flanged rotatable disc 70 which is attached to, by means of a wire 72, and rotates with, an annular collector ring 73 secured to the flange of the disc. Adjacent the disc 70, a brush 74, mounted upon a lug 75 of the support 57, engages the collector ring 73 and is provided with a wire connection 76 communicating with the power lines 66 to complete the electric circuit for driving the motor 65.

The inner end of the shaft 55 extends though the disc 70 and is disposed within a cylindrical bearing 77 provided in a sleeve 78 upon which the disc is rigidly mounted. At the outer end of the sleeve, a shaft 79 integral with the sleeve 78 or rigidly secured thereto, is journalled in a bearing bracket 80 carried by the support 57. A sprocket wheel 82 is rigidly connected to the outer end of the shaft 79 and it is operated by a chain 83 connected thereto, which extends to a sprocket wheel 84 rigidly connected to one end of the pulley shaft 25. A reduction gearing mechanism 85, similar to the gear mechanism 67 is driven by a motor 86 provided with wire connections 87 and 88 communicating with the power line 66.

The sprocket chains 53 and 83 are geared to the shafts 55 and 79, respectively, to rotate the latter shafts concurrently at the same rate of speed and consequently, the resistance unit 68 and disc 70 likewise will rotate in the same direction and at the same rate, although they are adapted to be relatively rotated. In the event that the electric motors 65 and 86, which drive the respective rollers, and the gearing mechanism, are subjected to any variation in speed, relative rotative movement of the resistance unit and disc of the rheostat 59 will simultaneously change the speed of the motor 65. This operation immediately reestablishes synchronized operation of the motors. As above mentioned, the conveyer or drive belts are subjected to distortion about the pulleys, which will cause a variation in the speed thereof despite the synchronized operation of the motors. This variation is compensated for by the operation of the disc wheel 30 by adjustment thereof along the slope of the crowned pulley or roller 12. Thus, when the mechanism is adjusted, the surface speed of the respective conveyer belts is maintained constant, and consequently the plies 20 and 22 will be fed at a uniform rate to the conveyer 23 from the belts 15 and 19.

From the foregoing description, it will be apparent that I have provided an apparatus which will obviate the necessity of making frequent adjustments and thus save time and labor incident to the operation of machinery of the above designated character.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claim.

What I claim is:

The combination with a machine provided with a roller mounted thereon having a crowned surface, of a plurality of shafts mounted on the machine one of the shafts being adapted to swing by gravity toward the roller, a disc wheel axially adjustable on the last named shaft whereby the rate of rotation of the wheel may be varied by adjusting the disc wheel to engage different portions of the crowned surface, and gear connections between the shafts for maintaining constant driving relationship between them regardless of the position of the swinging shaft.

In witness whereof, I have hereunto signed my name.

ELOV F. MAAS.